United States Patent [19]

Eachus

[11] Patent Number: 5,240,092
[45] Date of Patent: Aug. 31, 1993

[54] MOVING STRAIN RELIEF FOR SPIRALLED FLEXIBLE CABLE

[75] Inventor: James C. Eachus, Manor, Tex.

[73] Assignee: W. L. Gore & Associates, Inc., Newark, Del.

[21] Appl. No.: 854,382

[22] Filed: Mar. 19, 1992

[51] Int. Cl.$^5$ ............................................. H02G 11/00
[52] U.S. Cl. .................................. 191/12 R; 414/918; 439/13
[58] Field of Search ............. 191/12 R, 12 S, 12.2 R, 191/12.4; 414/918; 242/54 R; 439/4, 13, 14, 18

[56] References Cited

U.S. PATENT DOCUMENTS

| | | | |
|---|---|---|---|
| 1,999,089 | 4/1935 | Dowden | 191/12 S X |
| 2,332,374 | 10/1943 | Fagan | 248/52 X |
| 2,483,760 | 10/1949 | Duncan | 191/12 R X |
| 3,815,844 | 6/1974 | Wright et al. | 242/54 R X |
| 3,863,861 | 2/1975 | Bellasio | 242/54 R X |
| 3,982,402 | 9/1976 | Lang et al. | 242/54 R X |
| 4,062,608 | 12/1977 | Pierce | 439/4 |
| 4,241,884 | 12/1980 | Lynch | 242/54 R |
| 4,529,352 | 7/1985 | Suzuki et al. | 414/918 X |
| 4,583,700 | 4/1986 | Tschurbanoff | 191/12 R X |
| 4,828,225 | 5/1989 | Owen et al. | 191/12 R X |

FOREIGN PATENT DOCUMENTS

| | | | |
|---|---|---|---|
| 1956545 | 10/1977 | Fed. Rep. of Germany | 191/12 R |
| 2-218585 | 8/1990 | Japan | 414/918 |
| 2-311294 | 12/1990 | Japan | 414/918 |
| 0347213 | 4/1931 | United Kingdom | 439/4 |
| 1471654 | 4/1977 | United Kingdom | 191/12 R |

Primary Examiner—Frank E. Werner
Assistant Examiner—Scott L. Lowe
Attorney, Agent, or Firm—Gary A. Samuels

[57] ABSTRACT

A moving strain relief support arm, mounted on a machine frame, for a moving flexible coiled power or signal cable surrounding a reciprocating mandrel mounted on the machine frame and connecting to a tool mounted thereon for preventing friction and wear damage as the cable flexes, lengthens, and shortens around the moving mandrel.

4 Claims, 4 Drawing Sheets

MOVING STRAIN RELIEF FOR SPIRALLED FLEXIBLE CABLE

FIELD OF THE INVENTION

The invention relates to strain relieving supports for spiralled flexible cables which support and control the movement of a cable as it moves and flexes around moving mechanical parts of a robot machine tool.

BACKGROUND OF THE INVENTION

In certain forms of robot machine tools, there is a rotating or reciprocating mandrel portion of the tool upon one end of which is attached a tool for working or shaping materials under manufacture. In order to provide power or to control the tool, a means for signalling changes of location, angle, and other required modes is required. A power and/or a signal cable may be used to connect the tool to the remainder of the machine.

In the case of a tool attached to the end of a reciprocating mandrel, a convenient means of connection can be a cable spiralled around the reciprocating mandrel from the stationary bulk of the machine to the tool mounted on the mandrel. In operation, the coil of cable spiralled around the mandrel lengthens and shortens in one axis as the tool to which it is attached reciprocates back and forth performing its work. In another axis, the coils of cable may collapse on each other around the reciprocating mandrel to cause wear of the cable moving against its own coils or the mandrel as the mandrel continuously reciprocates within the coil of cable.

Increasing the stiffness of the cable to prevent such collapse of the coil of cable does not always solve the problem of wear, in that a very stiff cable may be difficult to bend into a spiral coil of appropriate size around the mandrel and may be too stiff to flex properly around the mandrel as the mandrel reciprocates and the cable coils lengthen and shorten with the movement of the tool head on the mandrel.

The invention provides an alternate means of support and strain relief for a coil of cable positioned around a reciprocating mandrel.

SUMMARY OF THE INVENTION

The invention comprises a moving strain relief arm for supporting a coil of cable surrounding a vertical reciprocating mandrel mounted on the frame of a machine, such as a robot machine tool, and connecting the stationary bulk of the machine with a tool mounted on the end of the reciprocating mandrel which is mounted on the frame of the machine.

The strain relief arm comprises an arm supported by and movably extending from suitable movable means, such as a bearing or bushing mounted on the stationary frame of a machine toward a coil of cable spiralling around a reciprocating mandrel. Mounted on the opposite end of the arm is a wear-resistant holder which supports a coil of the cable. The arm and holder support the cable to prevent collapse of the coils of cable upon each other and to hold the coils of the cable out of contact with the mandrel as the mandrel and the cable coil move during operation of the machine. As the mandrel reciprocates, the cable coil lengthens and shortens as the movement of the tool to which one end of the cable is mounted causes the cable coil to shorten and lengthen alternately.

The cable may be a jacketed electric signal cable, a coaxial electric signal cable, a fiber optic signal cable, a power cable, or several of these together within a tough polymer protective jacket.

The wear-resistant holder may comprise or be lined with a wear-resistant material, such as polytetrafluoroethylene (PTFE) or acetal resin, such as Delrin, for example, or may contain a pivoted roller of the same or other materials.

The holder may be arranged to support the topmost coil of cable or a lower coil of cable as can readily be determined by trial, considering the stiffness and other properties of the cable being supported.

DETAILED DESCRIPTION OF THE INVENTION

The invention is now described with reference to the figures to more carefully delineate the details thereof.

Figure 1:
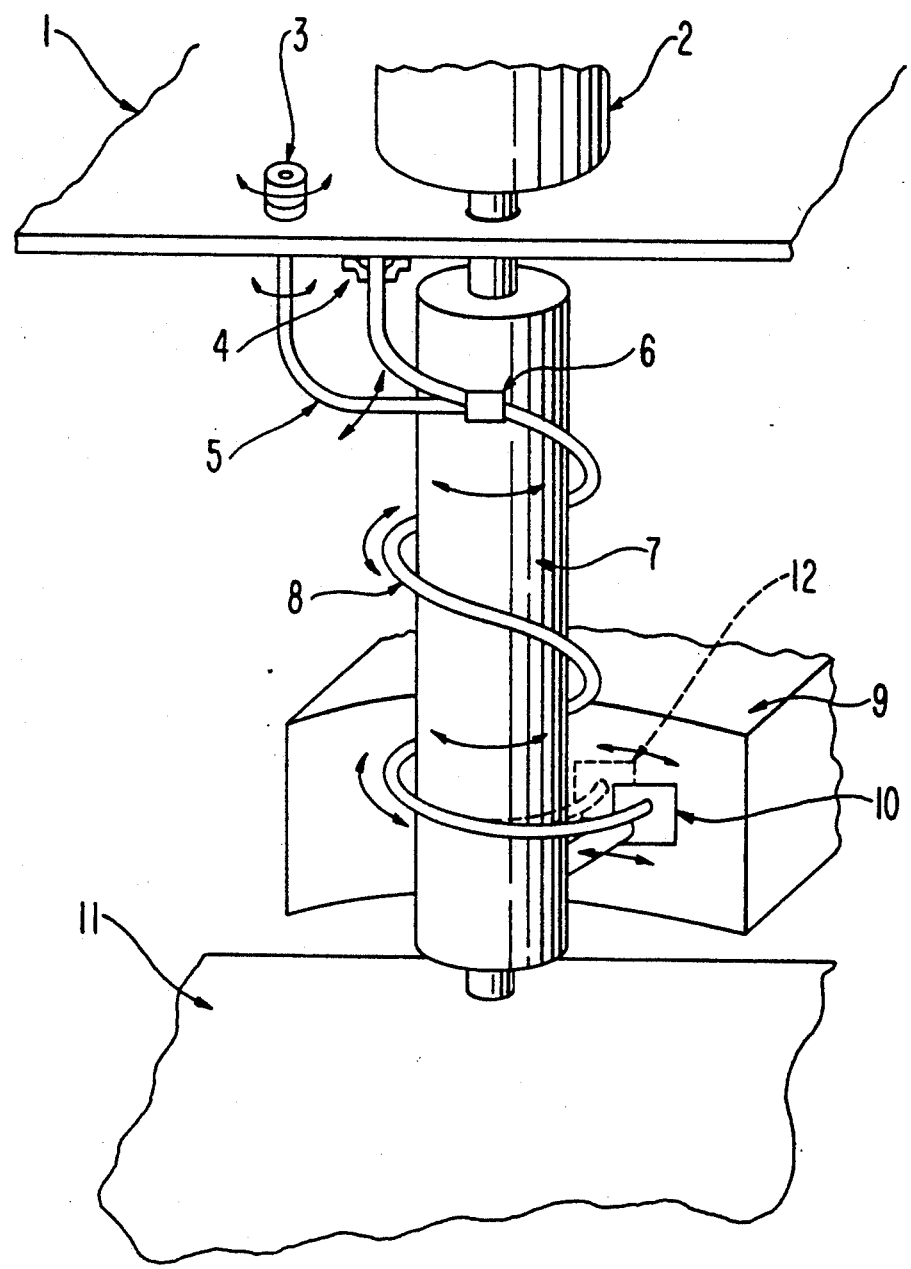
FIG. 1 is a diagram of a strain relief arm of the invention holding a cable surrounding a reciprocating mandrel.

FIG. 1 shows functional portions of a robot machine tool in which a reciprocating mandrel 7 is supported between bottom 11 and top 1 stationary frame portions of the machine, mandrel 7 being reciprocated by means of an electric motor 2, for example. A tool head 10 is affixed to the lower end of mandrel 7 and operates against work piece 9 as it moves to dotted-in position 12 from the position shown in the FIGURE. Connecting tool head 10 to a source of power and signals to direct its work against work piece 9 is cable 8, held in place on Frame 1 by bracket 4, which may be one or more electric, coaxial electric, or fiber optic power and/or signal cables within a tough, protective polymer jacket.

Cable 8 is spiralled around mandrel 7 at a predetermined distance from mandrel 7 so that, as mandrel 7 reciprocates and tool head 10 moves with it, the spiral of cable 8 lengthens and alternately shortens. As it moves repeatedly, cable 8 may touch mandrel 7 from time to time and thus be abraded and wear. To avoid such wear, moving strain relief arm 5 supports cable 8 as it moves and holds it away from the outer surface of reciprocating mandrel 7.

Arm 5 is supported on a stationary portion 1 of the machine and has a bushing or bearing, for example, incorporated in the end thereof of arm 5 so that arm 5 may freely rotate and move or pivot with minimum resistance to turning. Arm 5 extends downwardly and outwardly from its pivot support toward cable 8 and mandrel 7. Arm 5 has affixed on its outer end a holder 6 for support of cable 8. Cable 8 rides in a groove in the top of holder 6 as it moves back and forth in response to the push and pull motion of tool head 10. It is important that holder 6 comprises or is lined with a material which will offer the lowest possible resistance to sliding and moving of cable 8 across its surface. A material, such as PTFE in one of its many forms or an acetal resin, such as Delrin can be used. A roller may be placed across the groove in holder 6 to support cable 8 in an almost frictionless manner. Since a coil of cable 8 arranged vertically will tend to collapse on itself unless quite rigid, the important function of arm 5 with holder 6 is to support cable 8 by holding the coils apart to prevent damage from friction either by rubbing of the cable coils together as they move or against mandrel 7 as mandrel 7 reciprocates repeatedly and coils of cable 8 shorten and elongate as tool head 10, to which cable 8 is attached, moves back and forth. Since there are practical limits to cable stiffness which might tend to prevent collapse of vertical cable coils upon each other, the invention provides a practical solution to the problem of wear damage to a moving coil of cable.

Holder 5 is shown in FIG. 1 as supporting the first or upper coil of the cable. In practical application, the stiffness of cable 8 may require that holder 6 support the second or subsequent coil of cable 8 to most efficiently support the coils against collapse against each other and to prevent friction damage from abrasion of the coils against mandrel 7. A wider range of coil stiffness is thereby utilizable with the moving strain relief arm of the invention.

Figure 2:
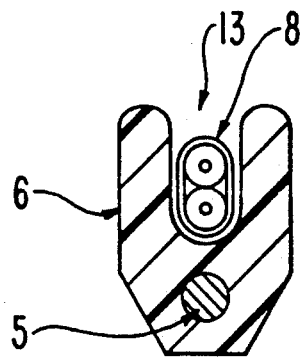
FIG. 2 is a cross-sectional view of the end of the cable holder affixed to the arm.
Figure 3:
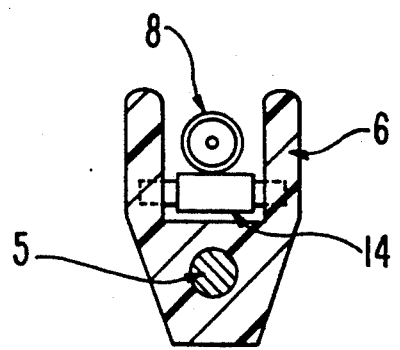
FIG. 3 is a cross-sectional view of a holder including a roller to minimize friction between a cable and the holder.

FIG. 2 shows a cross-sectional view of holder 6 mounted on the outside end of arm 5. Cable 8 rests in groove 13 of holder 6. An alternative configuration of holder 6 is shown in a cross-sectional view in FIG. 3. A roller 14 has been mounted across groove 13 upon which cable 8 rides back and forth in holder 6. Alternative forms of holder may include a "C"-clamp, a loop, or ring clamp, all of which may be lined with a friction-minimizing material, such as PTFE or an acetal resin.

Figure 4:
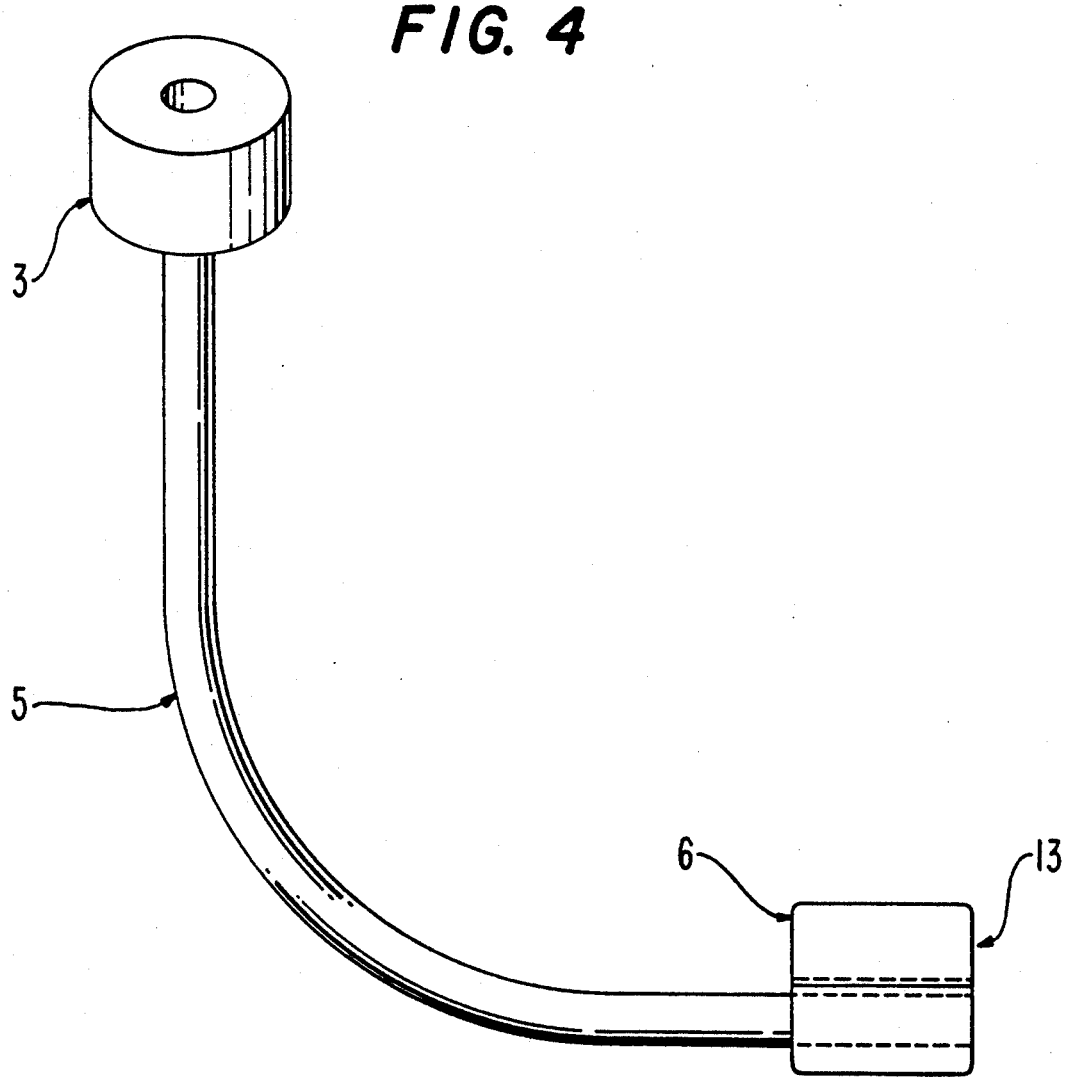
FIG. 4 is a side view of a strain relief arm of the invention.

The arm of the invention is shown in a side view in FIG. 4, with movable pivot 3 at the top which supports arm 5 movably when affixed to the stationary frame of the machine tool. Cable holder 6 is affixed at the opposite end of arm 5 from pivot 3 with groove 13 dotted in.

Figure 5:
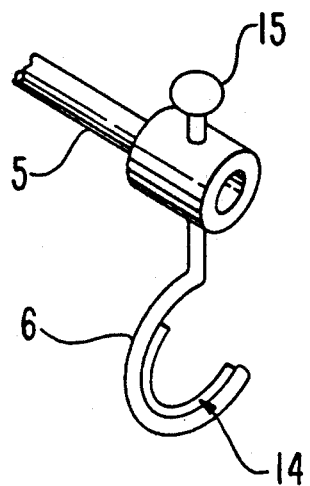
FIGS. 5, 6, and 7 are perspective views of holders in the form of a "C"-ring, a curved ring, and a loop, respectively.
Figure 6:
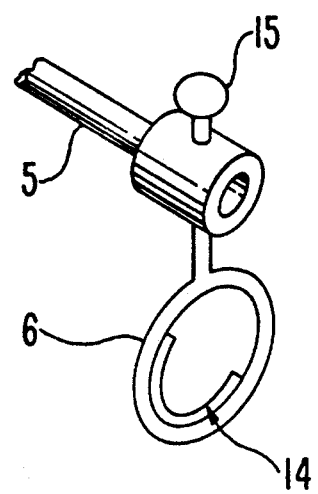
Figure 7:
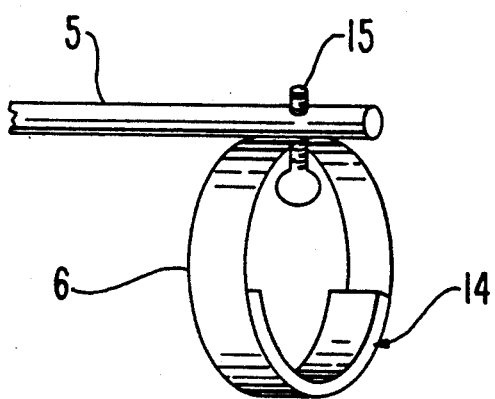

FIGS. 5, 6, and 7 describe alternate forms of holder 6. FIG. 5 is a "C"-clamp form of holder 6 having a thumb screw 15 to hold holder 6 to arm 5 and a friction-minimizing liner 14 adhered to the inside of the loop of the clamp. FIG. 6 shows a ringclamp alternative form of holder 6. FIG. 7 depicts a metal or stiff plastic loop form of holder attached to arm 5 by thumb screw 15. The loop is partially lined with friction-reducing material 14. Other means of attachment to arm 5 may be used instead of thumb screw 15.

The invention has the advantage that the strain relief technique it provides is unique in that the coils of cable are supported in a manner minimizing wear damage while the coil flexes and moves without any constraints to its movement. The entire coil of cable thus absorbs flex movement to achieve a maximum flex life.

I claim:

1. A robotic machine tool comprising:
   (a) a frame;
   (b) a reciprocating mandrel attached to the frame;
   (c) a first stationary element attached to the mandrel;
   (d) a second stationary element of the frame adapted to receive a movably mounted shaped strain relief arm of said second stationary element;
   (e) a coil of cable attached at one end to said frame and at the opposite end to said first stationary element attached to said mandrel and coiling around but not contacting said mandrel;
   (f) a holder mounted on the opposite end of said shaped arm from the attachment to said frame for supporting said coil of cable; and
   (g) said holder having grooved means to support said coil of said cable.

2. A robotic machine tool as defined in claim 1, wherein said strain relief arm can be pivoted in its mounting on said machine.

3. A robotic machine tool as defined in claim 1, wherein said strain relief arm includes a bushing or a bearing.

4. A robotic machine tool as defined in claim 1, wherein said grooved means of said holder is lined with polytetrafluoroethylene.

* * * * *